US010095949B2

(12) United States Patent
Long et al.

(10) Patent No.: US 10,095,949 B2
(45) Date of Patent: Oct. 9, 2018

(54) METHOD, APPARATUS, AND COMPUTER-READABLE STORAGE MEDIUM FOR AREA IDENTIFICATION

(71) Applicant: Xiaomi Inc., Beijing (CN)

(72) Inventors: Fei Long, Beijing (CN); Tao Zhang, Beijing (CN); Zhijun Chen, Beijing (CN)

(73) Assignee: Xiaomi Inc., Beijing (CN)

( * ) Notice: Subject to any disclaimer, the term of this patent is extended or adjusted under 35 U.S.C. 154(b) by 104 days.

(21) Appl. No.: 15/298,340

(22) Filed: Oct. 20, 2016

(65) Prior Publication Data
US 2017/0124419 A1 May 4, 2017

(30) Foreign Application Priority Data
Oct. 30, 2015 (CN) .......................... 2015 1 0726012

(51) Int. Cl.
G06K 9/48 (2006.01)
G06K 9/46 (2006.01)
G06K 9/00 (2006.01)
G06K 9/62 (2006.01)
(Continued)

(52) U.S. Cl.
CPC ....... *G06K 9/4609* (2013.01); *G06K 9/00442* (2013.01); *G06K 9/38* (2013.01); *G06K 9/4604* (2013.01); *G06K 9/4652* (2013.01); *G06K 9/6212* (2013.01); *G06T 7/0081* (2013.01); *G06T 7/0085* (2013.01); *G06K 2209/01* (2013.01); *G06T 2207/20016* (2013.01);
(Continued)

(58) Field of Classification Search
CPC .... G06K 2209/01; G06K 9/38; G06K 9/4609; G06K 9/4652; G06T 2207/20024; G06T 2207/30176
See application file for complete search history.

(56) References Cited

U.S. PATENT DOCUMENTS 6,731,800 B1 * 5/2004 Barthel .................... H04N 1/41
358/464
2009/0175537 A1 7/2009 Tribelhorn et al.
2011/0069180 A1 3/2011 Nijemcevic et al.
(Continued)

FOREIGN PATENT DOCUMENTS

CN 101751568 A 6/2010
CN 102982160 A 3/2013
(Continued)

OTHER PUBLICATIONS

Extended Search Report issued by the European Patent Office dated Mar. 13, 2017, in counterpart European Application No. 16195105.8.
(Continued)

*Primary Examiner* — Phuoc Tran
(74) *Attorney, Agent, or Firm* — Finnegan, Henderson, Farabow, Garrett & Dunner LLP

(57) ABSTRACT

A method for area identification includes identifying a plurality of candidate predefined edges in a document image of a document. The candidate predefined edges are edges in a predefined direction of the document. The method further includes determining one of the candidate predefined edges to be a target predefined edge and identifying at least one information area in the document image based on the target predefined edge.

13 Claims, 13 Drawing Sheets

(51) Int. Cl.
    *G06K 9/38*        (2006.01)
    *G06T 7/00*        (2017.01)

(52) U.S. Cl.
    CPC ............... *G06T 2207/20024* (2013.01); *G06T 2207/30176* (2013.01)

(56)            References Cited

U.S. PATENT DOCUMENTS

2011/0222779 A1    9/2011   Karanam et al.
    2014/0029853 A1    1/2014   Xue
    2015/0077817 A1    3/2015   Shimazaki et al.

FOREIGN PATENT DOCUMENTS

CN         103488984 A      1/2014
    CN         104217444 A      12/2014
    CN         104268864 A      1/2015
    CN         104408450 A      3/2015
    CN         104573616 A      4/2015
    CN         105528600 A      4/2016
    EP         2 858 007 A1     4/2015
    JP         H 08-161423 A    6/1996
    JP         2003-077099 A    3/2003
    JP         2012-221118 A    11/2012
    JP         2015-060448 A    3/2015
    KR         10-2006-0001704 A  1/2006
    KR         10-2009-0053177 A  5/2009
    KR         10-2015-0117975 A  10/2015
    RU         2005138164 A     6/2007

OTHER PUBLICATIONS

Korean Office Action issued by the Korean Patent Office dated Feb. 24, 2017, in counterpart Korean Application No. 10-2016-7005597.
Russian Office Action issued by the Russian Patent Office dated Apr. 20, 2017, in counterpart Russian Application No. 2016109047/08(014171).
International Search Report in International Application No. PCT/CN2015/099286, issued by the State Intellectual Property Office of the P.R. China as ISA, dated Jul. 21, 2016 (12 pages).

* cited by examiner

METHOD, APPARATUS, AND COMPUTER-READABLE STORAGE MEDIUM FOR AREA IDENTIFICATION

CROSS-REFERENCE TO RELATED APPLICATION

This application is based on and claims priority to Chinese Patent Application No. 201510726012.7, filed on Oct. 30, 2015, the entire contents of which are incorporated herein by reference.

FIELD

The present disclosure relates to image processing and, more particularly, to a method, apparatus, and computer-readable storage medium for area identification.

BACKGROUND

Identity (ID) card automatic identification refers to a technology for recognizing characters (text) on an ID card by image processing.

In conventional technologies, to automatically identify an ID card, the ID card is scanned by an ID card scanning device in a fixed relative position to obtain a scanned image of the ID card. Character recognition is performed on several areas in the scanned image to obtain information about at least one of name, gender, nationality, date of birth, address, or ID number. However, if the image is not obtained by the ID card scanning device but, for example, directly by photographing, it is difficult to identify the image of the ID card.

SUMMARY

In accordance with the present disclosure, there is provided a method for area identification including identifying a plurality of candidate predefined edges in a document image of a document. The candidate predefined edges are edges in a predefined direction of the document. The method further includes determining one of the candidate predefined edges to be a target predefined edge and identifying at least one information area in the document image based on the target predefined edge.

Also in accordance with the present disclosure, there is provided a device for area identification including a processor and a memory storing instructions that, when executed by the processor, cause the processor to identify a plurality of candidate predefined edges in a document image of a document. The candidate predefined edges are edges in a predefined direction of the document. The instructions further cause the processor to determine one of the candidate predefined edges to be a target predefined edge and identify at least one information area in the document image based on the target predefined edge.

Also in accordance with the present disclosure, there is provided a non-transitory computer readable storage medium having stored therein instructions that, when executed by a processor of a device, cause the processor to identify a plurality of candidate predefined edges in a document image of a document. The candidate predefined edges are edges in a predefined direction of the document. The instructions further cause the processor to determine one of the candidate predefined edges to be a target predefined edge and identify at least one information area in the document image based on the target predefined edge.

It is to be understood that both the forgoing general description and the following detailed description are exemplary only, and are not restrictive of the present disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which same numbers in different drawings represent same or similar elements unless otherwise described. The implementations set forth in the following description of exemplary embodiments do not represent all implementations consistent with the invention. Instead, they are merely examples of apparatuses and methods consistent with aspects related to the invention as recited in the appended claims.

Figure 1:
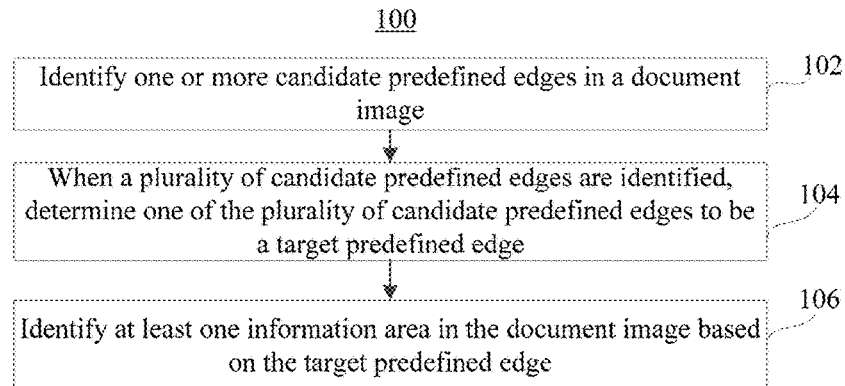
FIG. 1 is a flow diagram illustrating a method for area identification according to an exemplary embodiment.

FIG. 1 is a flow diagram illustrating a method 100 for area identification according to an exemplary embodiment. As illustrated in FIG. 1, at 102, one or more predefined edges in a document image are identified. The document image is an image obtained directly by photographing the document, such as an image of an identity (ID) card, an image of a social security card, or the like. A predefined edge is an edge in a predefined direction of the document, such as, for example, an upper edge, a lower edge, a left edge, or a right edge of the document. An identified predefined edge is also referred to herein as a candidate predefined edge.

At 104, when a plurality of candidate predefined edges are identified, one of the plurality of candidate predefined edges is determined to be a target predefined edge. Hereinafter, a plurality of candidate predefined edges are also referred to as n candidate predefined edges, where n is a positive integer equaling or larger than 2. The document image can be influenced by multiple factors such as, for example, shooting angle, background, illumination condition, and parameters of the photographing. As such, more than one predefined edge may be identified when identifying the predefined edge, and one of the n candidate predefined edges needs to be determined as the target predefined edge of the document in the document image.

At 106, at least one information area in the document image is identified based on the target predefined edge. The position of the target predefined edge in the document image is relatively fixed. Therefore, respective information areas on the document can be determined in the document image based on the target predefined edge.

An information area refers to an area in the document image that contains characters, such as at least one of a name area, a date of birth area, a gender area, an address area, an identity number area, a serial number area, an issuing office area, an expiration date area, or the like.

Figure 2:
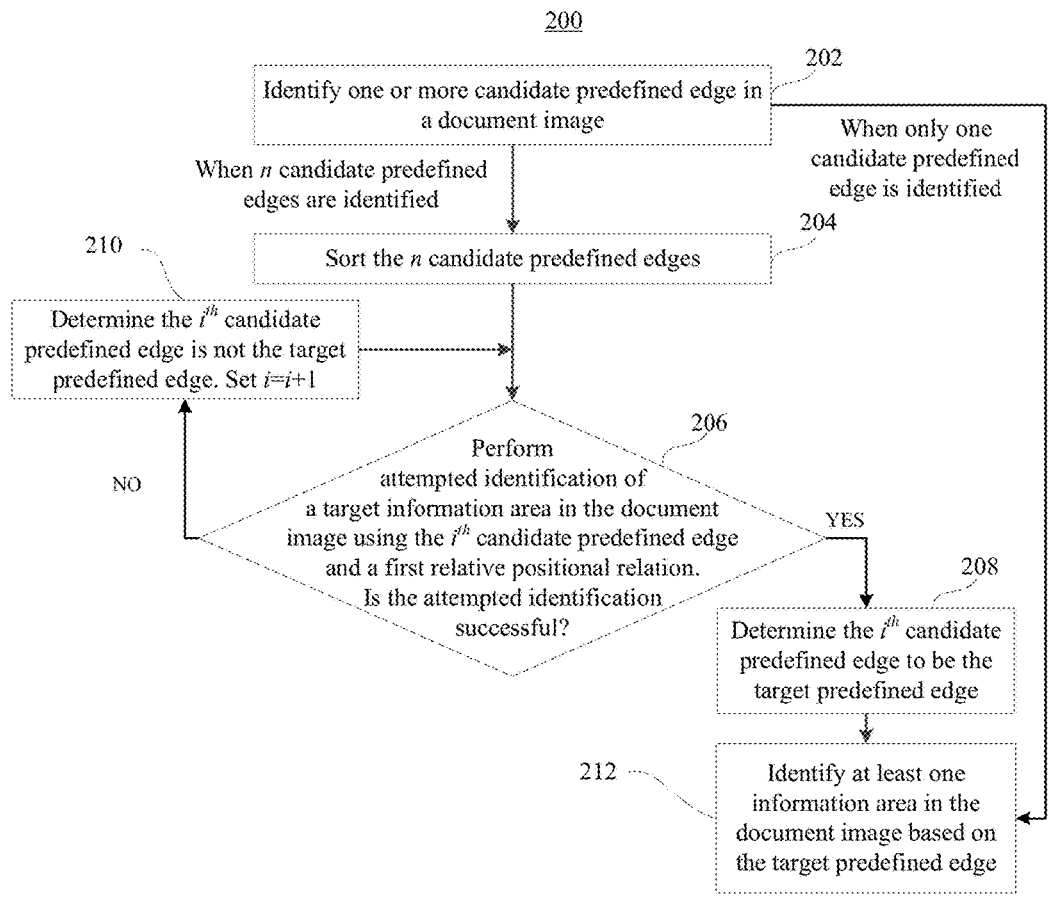
FIG. 2 is a flow diagram illustrating a method for area identification according to another exemplary embodiment.

FIG. 2 is a flow diagram illustrating a method 200 for area identification according to another exemplary embodiment. As illustrated in FIG. 2, at 202, one or more candidate predefined edges are identified in a document image.

In some embodiments, when the document is being photographed, a rectangular region can be provided in a photographing interface for guiding the photographing. A user can align the rectangular region with the document and photograph the document to obtain the document image.

In some embodiments, based on the obtained document image, a candidate predefined edge of the document in the document image can be identified using a straight line detection technology.

When only one candidate predefined edge is identified in the document image, the identified candidate predefined edge is determined to be the target predefined edge of the document in the document image, and the process flow proceeds to 212.

When n candidate predefined edges of the document in the document image are identified, the process flow proceeds to 204.

At 204, the n candidate predefined edges are sorted. According to the present disclosure, the plurality of candidate predefined edges can be sorted based on the possibility of being the target predefined edge in a descending order.

At 206, an attempted identification of a target information area in the document image is performed using the $i^{th}$ candidate predefined edge in the sorted candidate predefined edges and a first relative positional relation, where i is a positive integer, $1 \leq i \leq n$, and i is initially set to 1, and it is determined whether the attempted identification is successful. The $i^{th}$ candidate predefined edge is also referred to herein as a "trial predefined edge." The first relative positional relation refers to a relative positional relation between the target predefined edge and the target information area. The target information area is an information area that is usually easy to identify. As described below, the sorted candidate predefined edges are tried one by one according to the descending order until the target predefined edge is determined.

If the target information area is identified successfully (206: YES), the $i^{th}$ candidate predefined edge is determined to be the target predefined edge (at 208). On the other hand, if the target information area cannot be identified using the $i^{th}$ candidate predefined edge (206: NO), the $i^{th}$ candidate predefined edge is determined not to be the target predefined edge and a new value of i is calculated according to i=i+1 (at 210). Then the attempted identification in 206 is repeated with the new value of i.

At 212, at least one information area in the document image is identified based on the target predefined edge and a second relative positional relation. The at least one information area can be at least one of the name area, the date of birth area, the gender area, the address area, the ID number area, the serial number area, the issuing office area, the expiration date area, or the like. The second relative positional relation refers to a relative positional relation between the target predefined edge and the at least one information area. The first relative positional relation is a subset of the second relative positional relation. For example, the second relative positional relation can include the relative positional relation between the target predefined edge and the name area, the relative positional relation between the target predefined edge and the date of birth area, or the relative positional relation between the target predefined edge and the gender area, and so on.

Figure 3A:
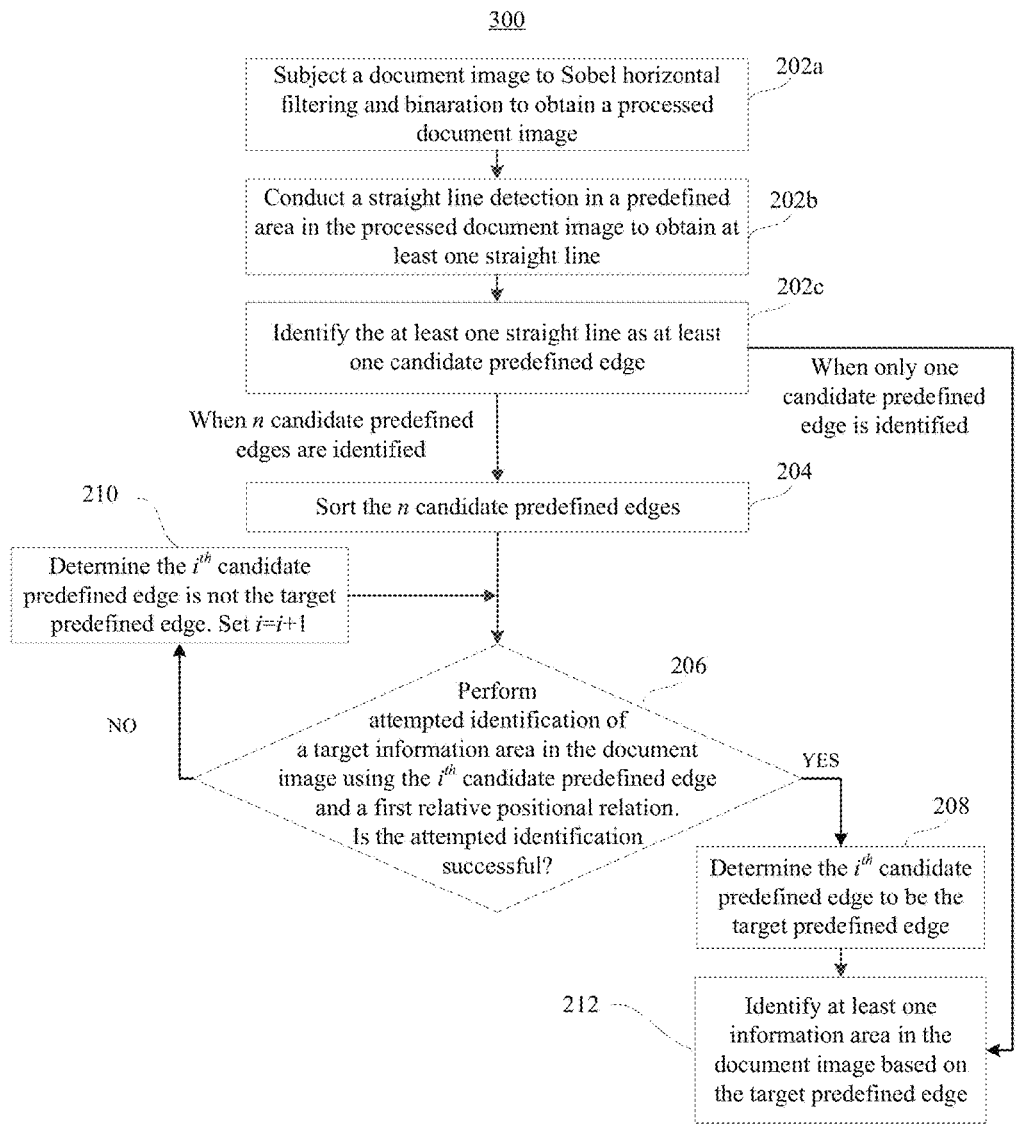
FIG. 3A is a flow diagram illustrating a method for area identification according to another exemplary embodiment.

FIG. 3A is a flow diagram illustrating a method 300 for area identification according to another exemplary embodiment. The method 300 is similar to the method 200, except that the method 300 includes a detailed process for identifying the one or more candidate predefined edge (202 in FIG. 2).

Figure 3B:
FIG. 3B is a schematic diagram illustrating an example of a processed document image.

As shown in FIG. 3A, at 202a, the document image is subjected to Sobel horizontal filtering and binarization to obtain a processed document image. That is, the document image is first filtered with a Sobel operator in a horizontal direction. Then, the filtered document image is binarized, i.e., gray values of pixels in the filtered document image are compared with a predefined gray threshold to divide the pixels into two groups: a group of pixels having a gray value larger than the predefined gray threshold and a group of pixels having a gray value smaller than the predefined gray threshold. The two groups of pixels are presented with black and white, respectively, to obtain a binarized document image. The binarized document image is the processed document image. FIG. 3B shows an example of the processed document image. The pixels having a color of a foreground are also referred to as "foreground color pixels," i.e., the white pixels in FIG. 3B. The pixels having a color of a background are also referred to as "background color pixels," i.e., the black pixels in FIG. 3B.

Figure 3C:
FIG. 3C is a schematic diagram illustrating an exemplary result of a straight line detection.

At 202b, a straight line detection is conducted in a predefined area in the processed document image to obtain at least one straight line. The predefined area is an area positioned in a predefined direction of the document. For example, the predefined area can be, for example, an area where the lower edge of the document is located in the document image, or an area where the upper edge of the document is located in the document image. The straight line detection can include, for example, straight line fitting or Hough transformation. FIG. 3C shows an exemplary result of the straight line detection.

Figure 3D:
FIG. 3D is a schematic diagram illustrating an example of a binarized image containing an identified candidate lower edge.

At 202c, the obtained at least one straight line is identified as at least one candidate predefined edge. FIG. 3D shows an example of a binarized image containing an identified candidate lower edge.

When only one candidate predefined edge is identified, i.e., only one straight line is obtained, the process flow proceeds to 212. On the other hand, when n candidate predefined edges are identified, i.e., n straight lines are obtained, the process flow proceeds to 204.

Figure 4:
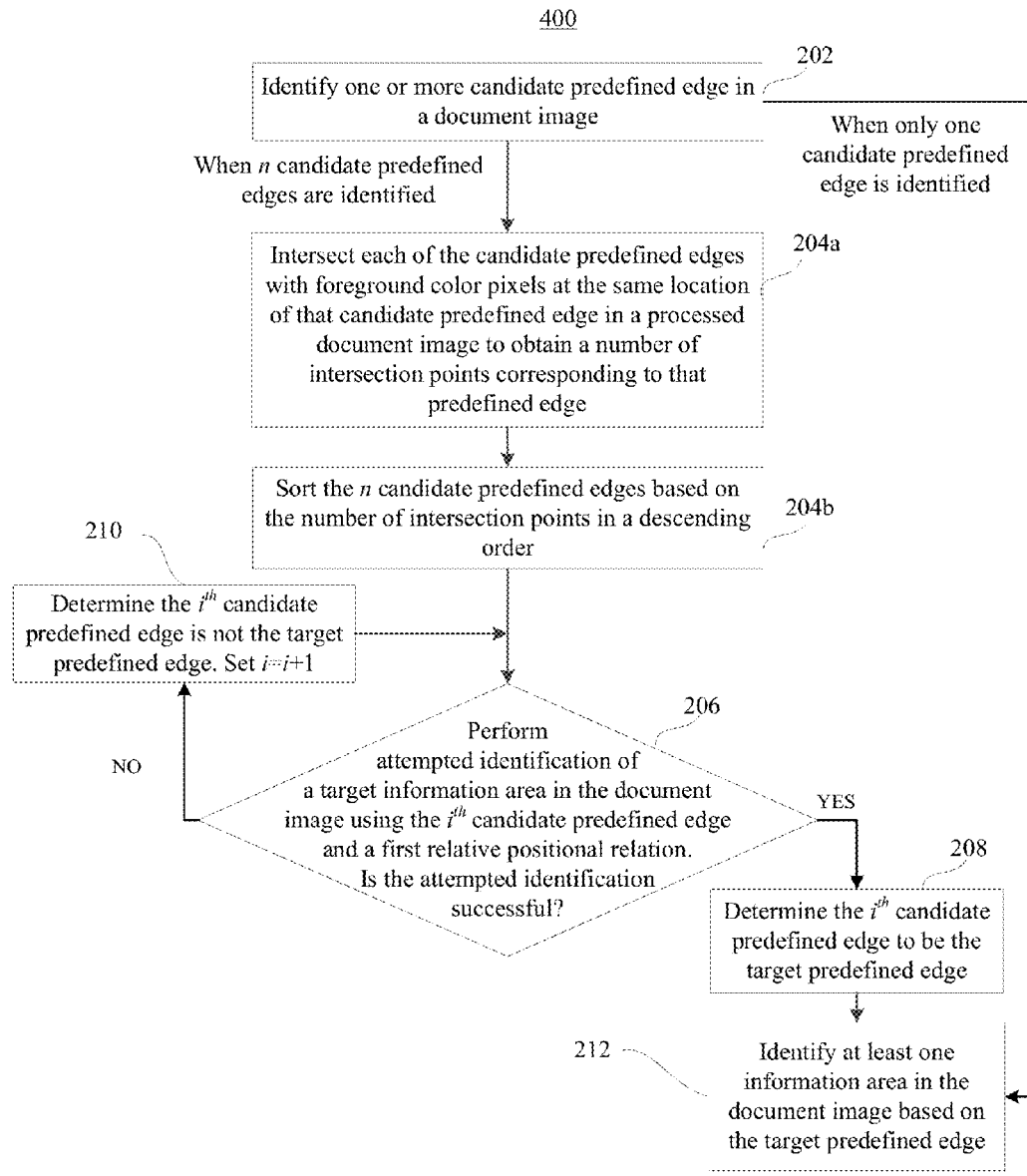
FIG. 4 is a flow diagram illustrating a method for area identification according to another exemplary embodiment.

FIG. 4 is a flow diagram illustrating a method 400 for area identification according to another exemplary embodiment. The method 400 is similar to the method 200, except that the method 400 includes a detailed process for sorting the n candidate predefined edge (204 in FIG. 2).

As shown in FIG. 4, at 204a, each of the candidate predefined edges is intersected with foreground color pixels at the same position of that candidate predefined edge in a processed document image to obtain a number of intersection points corresponding to that candidate predefined edge. That is, for each candidate predefined edge, the foreground color pixels at the same position corresponding to that candidate predefined edge in the processed document image are counted. The processed document image can be obtained by subjecting the document image to Sobel horizontal filtering and binarization, as described above in connection with FIG. 3A.

At 204b, the n candidate predefined edges are sorted according to the number of intersection points in a descending order, to obtain n sorted candidate predefined edges.

Figure 5A:
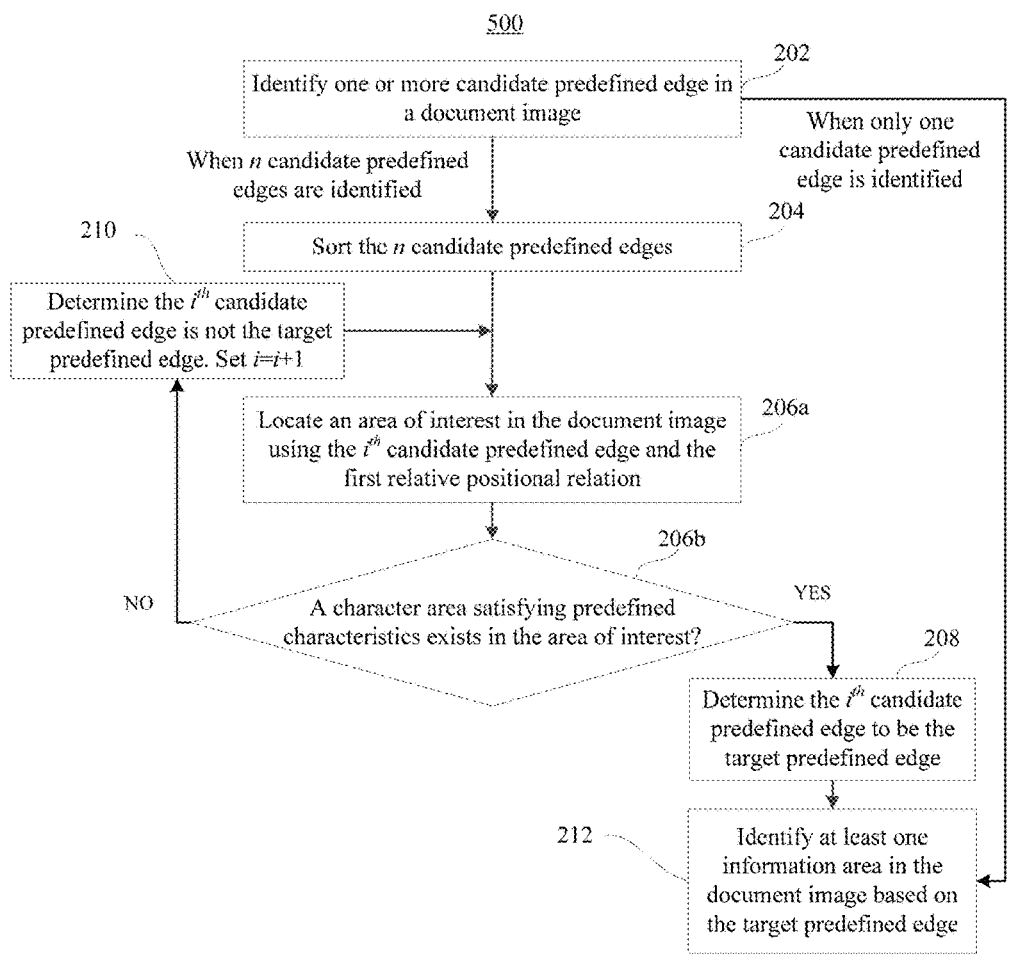
FIG. 5A is a flow diagram illustrating a method for area identification according to another exemplary embodiment.

FIG. 5A is a flow diagram illustrating a method 500 for area identification according to another exemplary embodiment. The method 500 is similar to the method 200, except that the method 500 includes a detailed process for performing the attempted identification.

Figure 5B:
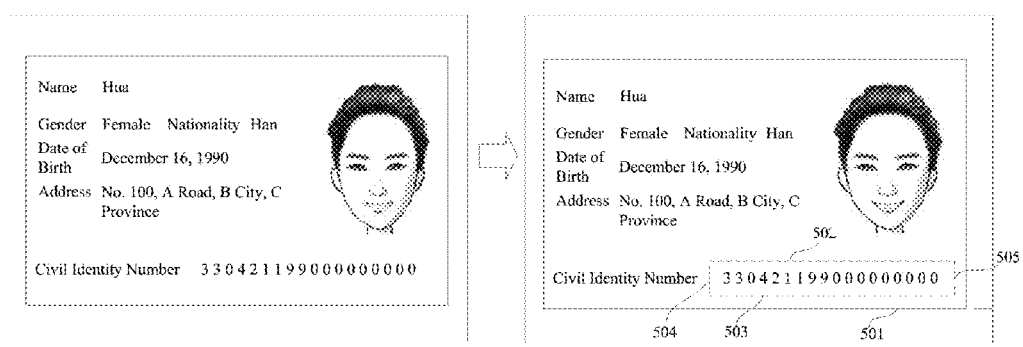
FIG. 5B is a schematic diagram illustrating the determination of a target information area according to an exemplary embodiment.

As shown in FIG. 5A, at 206a, an area of interest in the document image is located using the $i^{th}$ candidate predefined edge and the first relative positional relation. More specifically, based on the $i^{th}$ candidate predefined edge and the first relative positional relation, approximate positions of the upper edge, lower edge, left edge, and right edge of the area of interest can be determined. For example, FIG. 5B schematically shows an exemplary ID card. In the case that the target predefined edge is the lower edge of the ID card, the $i^{th}$ candidate predefined edge in FIG. 3C is assumed to be the lower edge 501 of the ID card. Based on the relative positional relation between the lower edge 501 of the ID card and the ID number, the approximate positions of the upper edge 502, lower edge 503, left edge 504, and right edge 505 of the ID number can be determined, as shown in FIG. 5B.

At 206b, it is determined whether a character area satisfying predefined characteristics exists in the area of interest. The predefined characteristics are characteristics possessed by the character area in the target information area. For example, if the target information area is the ID number area, the predefined characteristics can be: containing 18 consecutive character areas (or 18 number areas), small character space between two adjacent character areas, and the height of each character area being in a predefined range. If there is a character area satisfying the predefined characteristics in the area of interest (206b: YES), it is determined that the target information area is identified successfully, and the process flow proceeds to 208. If no character area satisfying the predefined characteristics exists in the area of interest (206b: NO), it is determined that the target information area is not identified, and the process flow proceeds to 210.

Figure 6A:
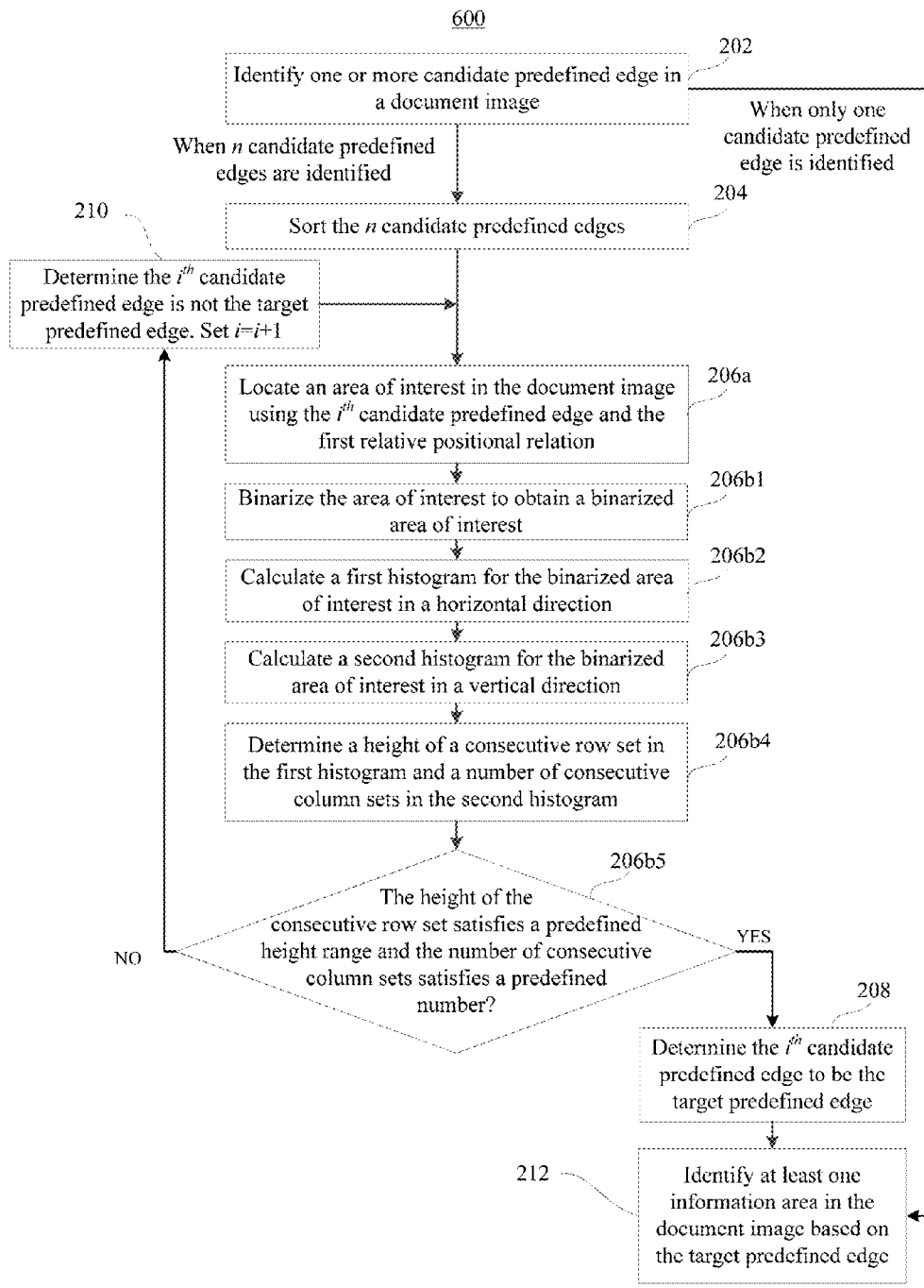
FIG. 6A is a flow diagram illustrating a method for area identification according to another exemplary embodiment.

FIG. 6A is a flow diagram illustrating a method 600 for area identification according to another exemplary embodiment. The method 600 is similar to the method 500, except that the method 600 includes a detailed process for determining whether a character area satisfying predefined characteristics exists in the area of interest.

As shown in FIG. 6A, at 206b1, the area of interest is binarized to obtain a binarized area of interest. In some embodiments, the area of interest can first be pre-processed. The pre-process can include one or more operations such as de-noising, filtering, edge extraction, and so on. The pre-processed area of interest is then binarized.

Figure 6B:
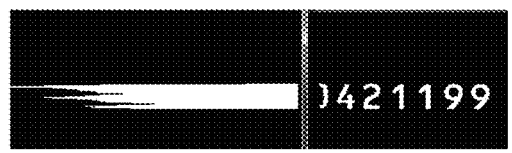
FIG. 6B is a schematic diagram illustrating an exemplary horizontal histogram.

At 206b2, a first histogram for the binarized area of interest is calculated in a horizontal direction of the binarized area of interest. The first histogram is also referred to herein as a "horizontal histogram." The vertical direction in the horizontal histogram represents vertical coordinates of the pixels in the binarized area of interest, and the horizontal direction in the horizontal histogram represents the number of foreground color pixels, i.e., white pixels, in each row of pixels having the same vertical coordinate. FIG. 6B shows an exemplary horizontal histogram.

Figure 6C:
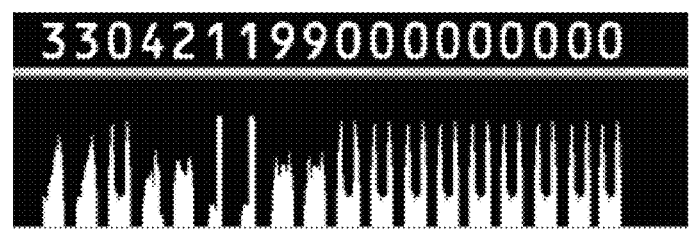
FIG. 6C is a schematic diagram illustrating an exemplary vertical histogram.

At 206b3, a second histogram for the binarized area of interest is calculated in a vertical direction of the binarized area of interest. The second histogram is also referred to herein as a "vertical histogram." The horizontal direction in the vertical histogram represents horizontal coordinates of the pixels in the binarized area of interest, and the vertical direction in the vertical histogram represents the number of foreground color pixels, i.e., white pixels, in each column of pixels having the same horizontal coordinate. FIG. 6C shows an exemplary vertical histogram.

At 206b4, a height of a consecutive row set in the horizontal histogram and a number of consecutive column sets in the vertical histogram are determined.

Figure 6D:
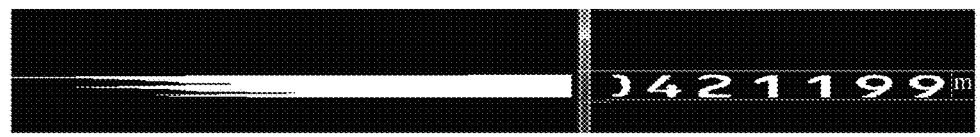
FIG. 6D is a schematic diagram illustrating the exemplary horizontal histogram of FIG. 6B with a set of consecutive rows identified.

The consecutive row set refers to a set of m consecutive rows of pixels, each of which has a number of foreground color pixels larger than a first threshold. For example, as shown in FIG. 6D, for each of the m consecutive rows of pixels, the number of foreground color pixels in the horizontal histogram shown in the left half is larger than the first threshold. The m consecutive rows of pixels correspond to a row of ID number "0421299" in the document image. The height of the m consecutive rows of pixels is thus the height of the consecutive row set.

Figure 6E:
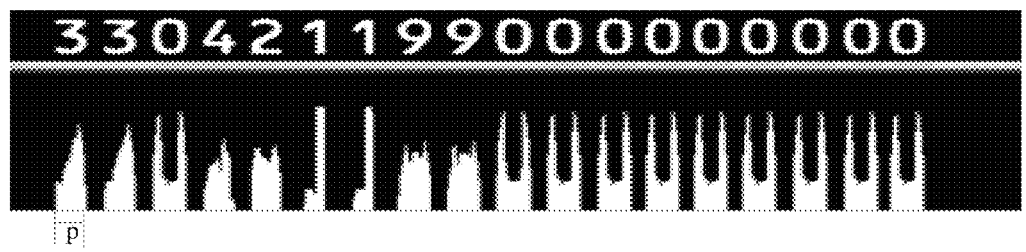
FIG. 6E is a schematic diagram illustrating the exemplary vertical histogram of FIG. 6C with a set of consecutive columns identified.

A consecutive column set refers to a set of p consecutive columns of pixels, each of which has a number of foreground color pixels larger than a second threshold. For example, as shown in FIG. 6E, a consecutive column set is represented by letter "p." For each of the p consecutive columns of pixels in FIG. 6E, the number of foreground color pixels in the vertical histogram shown in the lower half is larger than the second threshold. The p consecutive columns of pixels correspond to a character area "3" in the document image.

At 206b5, it is determined whether the height of the consecutive row set satisfies a predefined height range, and the number of consecutive column sets satisfies a predefined number. If the height of the consecutive row set satisfies the predefined height range and the number of consecutive column sets satisfies the predefined number (206b5: YES), it is determined that the character area satisfying the predefined characteristics exists in the area of interest, i.e., the target information area is identified successfully, and the process flow proceeds to 208. On the other hand, if the height of the consecutive row set does not satisfy the predefined height range or the number of consecutive column sets does not satisfy the predefined number (206b5: NO), it is determined that no character area satisfying the predefined characteristics exists in the area of interest, i.e., the target information area is not identified, and the process flow proceeds to 210.

Figure 7:
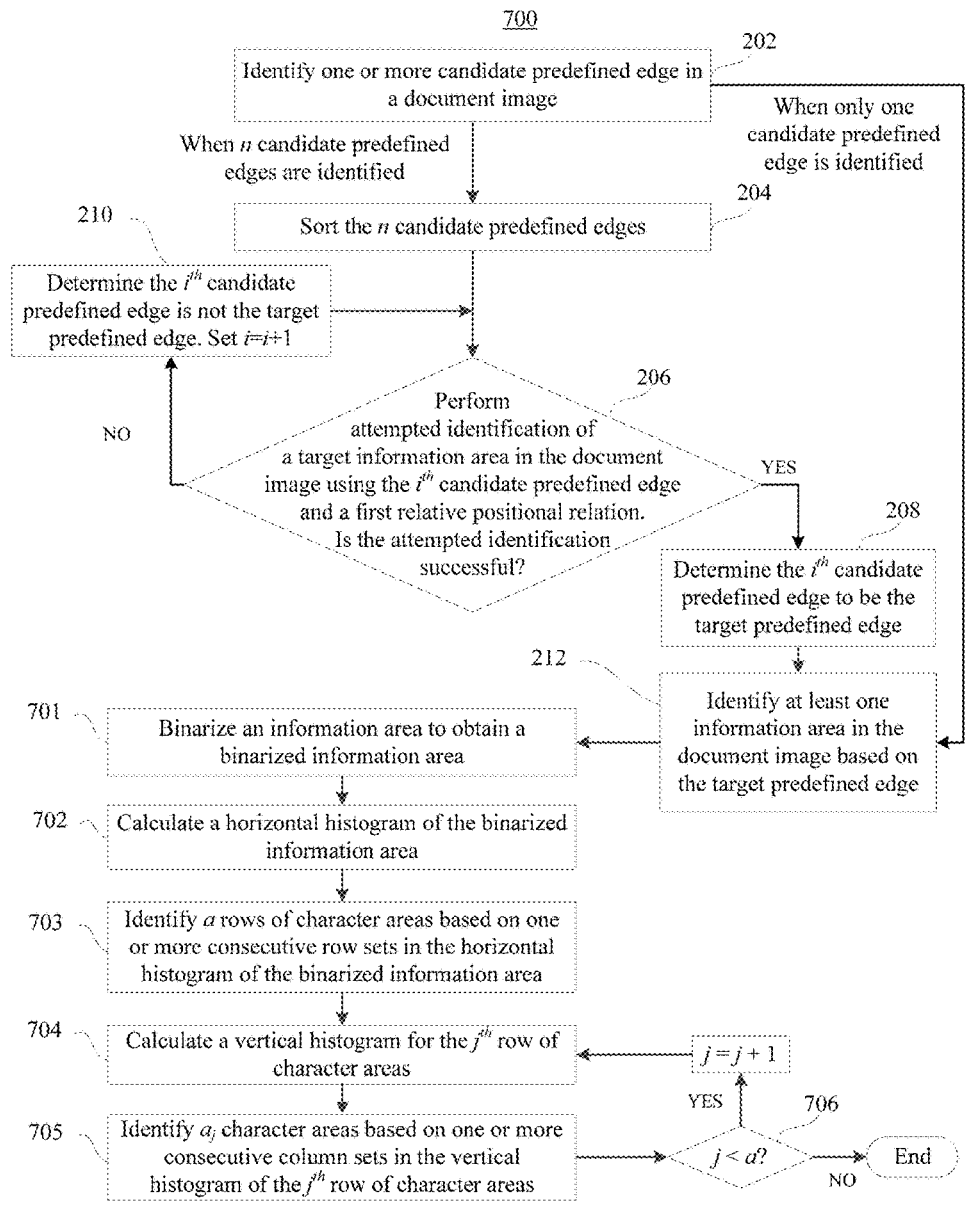
FIG. 7 is a flow diagram illustrating a method for area identification according to another exemplary embodiment.

FIG. 7 is a flow diagram illustrating a method 700 for area identification according to another exemplary embodiment. The method 700 is similar to the method 200, except that the method 700 includes a further process to recognize characters in an identified information area.

As shown in FIG. 7, at 701, the information area is binarized to obtain a binarized information area. In some embodiments, the information area can first be pre-processed by, for example, de-noising, filtering, edge extraction, and so on. The pre-processed information area is then binarized.

At 702, a horizontal histogram of the binarized information area is calculated in a horizontal direction of the information area. The vertical direction in this horizontal histogram represents vertical coordinates of the pixels in the binarized information area, and the horizontal direction in this horizontal histogram represents the number of foreground color pixels, i.e., white pixels, in each row of the binarized information area having the same vertical coordinate.

At 703, a rows of character areas are identified based on one or more consecutive row sets in the horizontal histogram of the binarized information area, where a is a positive integer. Each of the one or more consecutive row sets includes consecutive rows of pixels, each of which has a number of foreground color pixels larger than the first threshold. Each such consecutive row set is identified as a row of character areas. In some embodiments, if the information area is, for example, the ID number area, one row of character areas may be identified, i.e., a=1. In some embodiments, if the information area is, for example, the address area, more than one row of character areas may be identified, i.e., a>1.

At 704, for the $j^{th}$ row of character areas, a vertical histogram is calculated in a vertical direction of the information area. Where j is a positive integer, $1 \leq j \leq a$, and j is initially set to 1. The horizontal direction in this vertical histogram represents horizontal coordinates of the pixels in the $j^{th}$ row of character areas, and the vertical direction in this vertical histogram represents the number of foreground color pixels, i.e., white pixels, in each column of the $j^{th}$ row of character areas that has the same horizontal coordinate.

At 705, $a_j$ character areas are identified based on one or more consecutive column sets in the vertical histogram of the $j^{th}$ row of character areas, where $a_j$ is a positive integer. Each of the one or more consecutive column sets includes consecutive columns of pixels, each of which has a number of foreground color pixels larger than the second threshold described above with reference to FIG. 6E. Each such consecutive column set is identified as a character area. Depending on the information area, one, i.e., $a_j=1$, or more, i.e., $a_j>1$, character areas can be identified. For example, in FIG. 6E, 18 character areas can be identified.

At 706, it is determined whether j is smaller than a. If j is smaller than a (706: YES), which means one or more rows of character areas have not been processed, j increments by 1, i.e., j=j+1, and the process flow returns to 704. If j is not smaller than a (706: NO), which means all rows of character areas have been processed, the process flow ends.

In some embodiments, for each identified character area, the character contained in the character area can be recognized through a character recognition technology. The character can be, for example, a Chinese character, an English letter, a number, or a single character in another language.

Exemplary apparatuses consistent with the present disclosure will be described below. Operations of the exemplary apparatuses are similar to the exemplary methods described above, and thus detailed description thereof is omitted here.

Figure 8:
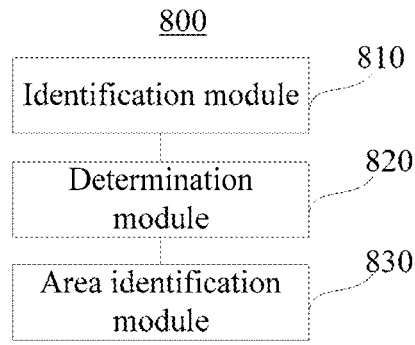
FIG. 8 is a block diagram illustrating a device for area identification according to an exemplary embodiment.

FIG. 8 is a block diagram illustrating an apparatus 800 for area identification according to an exemplary embodiment. As shown in FIG. 8, the apparatus 800 includes an identification module 810, a determination module 820, and an area identification module 830.

The identification module 810 is configured to identify one or more predefined edges in a document image. The document image is an image obtained directly by photographing the document, such as an image of an ID card, an image of a social security card, or the like. A predefined edge is an edge in a predefined direction of the document, such as, for example, an upper edge, a lower edge, a left edge, or a right edge of the document. An identified predefined edge is also referred to herein as a candidate predefined edge.

The determination module 820 is configured to determine one of n candidate predefined edges to be a target predefined edge, where n is a positive integer and $n \geq 2$.

The area identification module 830 is configured to identify at least one information area in the document image based on the target predefined edge. An information area refers to an area in the document image that contains characters, such as at least one of a name area, a date of birth area, a gender area, an address area, an ID number area, a serial number area, an issuing office area, an expiration date area, or the like.

Figure 9:
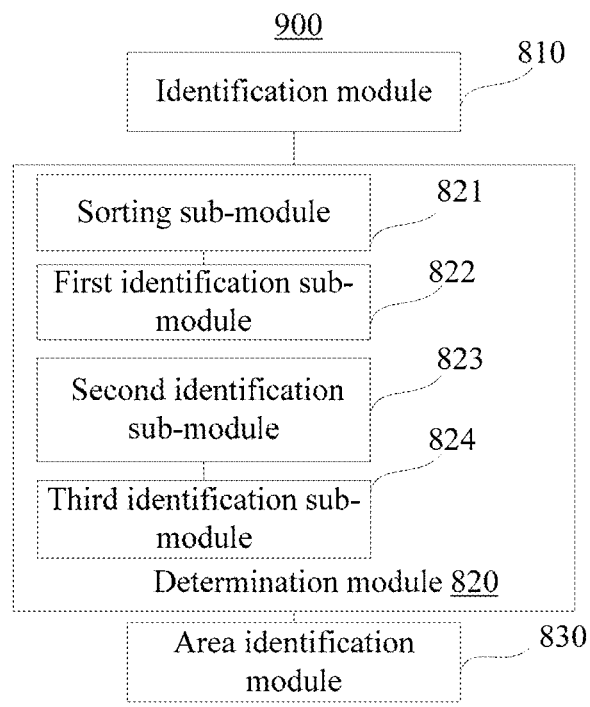
FIG. 9 is a block diagram illustrating a device for area identification according to another exemplary embodiment.

FIG. 9 is a block diagram illustrating an apparatus 900 for area identification according to another exemplary embodiment. The apparatus 900 includes the identification module 810, the determination module 820, and the area identification module 830. Further, as shown in FIG. 9, the determination module 820 includes a sorting sub-module 821, a first identification sub-module 822, a second identification sub-module 823, and a third identification sub-module 824.

The sorting sub-module 821 is configured to sort the n candidate predefined edges. In some embodiments, the n candidate predefined edges can be sorted based on the possibility of being the target predefined edge in a descending order.

The first identification sub-module 822 is configured to perform an attempted identification of a target information area in the document image using the $i^{th}$ candidate predefined edge and a first relative positional relation, and determine whether the attempted identification is successful, where i is a positive integer, $1 \leq i \leq n$, and i is initially set to 1. The first relative positional relation is a relative positional relation between the target predefined edge and the target information area. In some embodiments, the sorted candidate predefined edges are tried one by one.

The second identification sub-module 823 is configured to determine the i$^{th}$ candidate predefined edge to be the target predefined edge if the target information area is successfully identified by the first identification sub-module 822 using the i$^{th}$ candidate predefined edge.

The third identification sub-module 824 is configured to set i to i+1 and return to the first identification sub-module 822 to perform the attempted identification again using the next candidate predefined edge, if the target information area is not identified by the first identification sub-module 822 using the i$^{th}$ candidate predefined edge.

In some embodiments, the area identification module 830 is further configured to determine at least one information area based on the target predefined edge and a second relative positional relation. The second relative positional relation is a relative positional relation between the target predefined edge and the information area.

Figure 10:
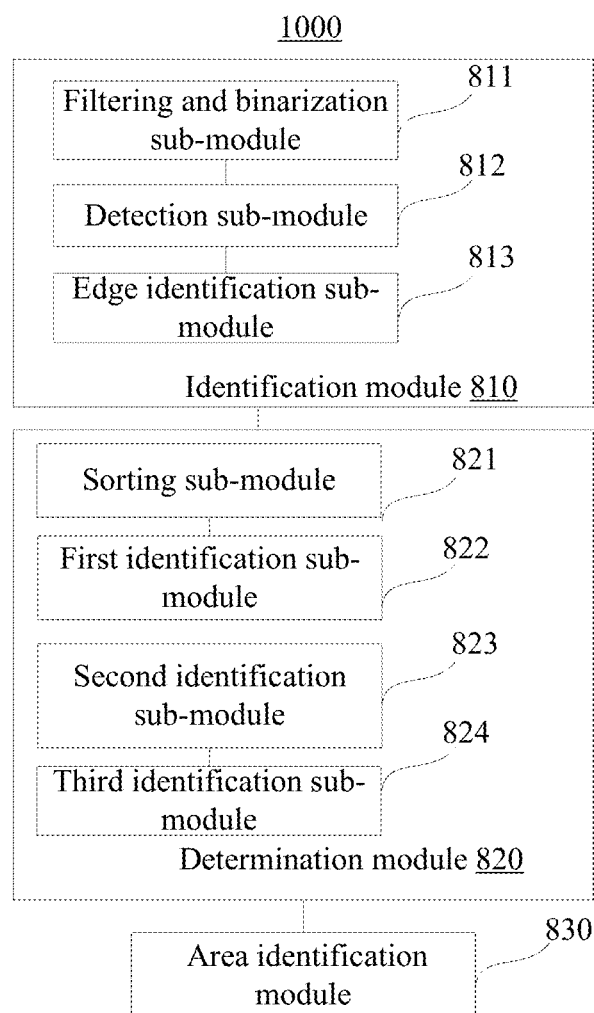
FIG. 10 is a block diagram illustrating a device for area identification according to another exemplary embodiment.

FIG. 10 is a block diagram illustrating an apparatus 1000 for area identification according to another exemplary embodiment. The apparatus 1000 includes the identification module 810, the determination module 820, which includes the sorting sub-module 821, the first identification sub-module 822, the second identification sub-module 823, and the third identification sub-module 824, and the area identification module 830. Further, as shown in FIG. 10, the identification module 810 includes a filtering and binarization sub-module 811, a detection sub-module 812, and an edge identification sub-module 813.

The filtering and binarization sub-module 811 is configured to subject the document image to Sobel horizontal filtering and binarization to obtain a processed document image. Binarization refers to comparing gray values of pixels in the filtered document image with a predefined gray threshold and dividing the pixels into two groups: a group of pixels having a gray value larger than the predefined gray threshold and a group of pixels having a gray value smaller than the predefined gray threshold. The two groups of pixels are presented with black and white, respectively, to generate the binarized document image.

The detection sub-module 812 is configured to conduct a straight line detection in a predefined area in the processed document image to obtain at least one straight line. The predefined area is an area positioned in a predefined direction of the document. The straight line detection can include, for example, straight line fitting or Hough transformation.

The edge identification sub-module 813 is configured to identify the obtained at least one straight line as at least one candidate predefined edge. When only one straight line is obtained, the edge identification sub-module 813 identifies this straight line as the target predefined edge in the document image and forwards the identified target predefined edge to the area identification module 830. When two or more straight lines are obtained, the edge identification sub-module 813 identifies the two or more straight lines as two or more candidate predefined edges and forwards the candidate predefined edges to the sorting sub-module 821.

Figure 11A:
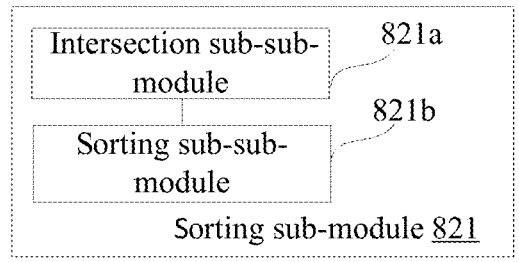
FIG. 11A is a block diagram illustrating an exemplary sorting sub-module in the device shown in FIGS. 9 and 10.

In some embodiments, as shown in FIG. 11A, the sorting sub-module 821 includes an intersection sub-sub-module 821a and a sorting sub-sub-module 821b. The intersection sub-sub-module 821a is configured to intersect each of the candidate predefined edges with foreground color pixels at the same position of that candidate predefined edge in the processed document image, to obtain a number of intersection points corresponding to that candidate predefined edge. The sorting sub-sub-module 821b is configured to sort the candidate predefined edges based on the number of intersection points in a descending order, to obtain sorted candidate predefined edges.

Figure 11B:
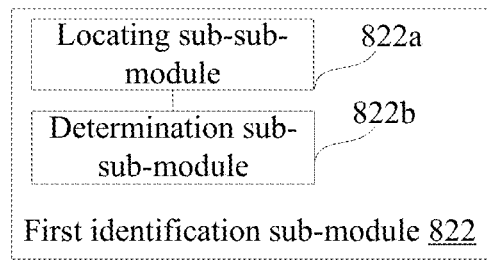
FIG. 11B is a block diagram illustrating an exemplary first identification sub-module in the device shown in FIGS. 9 and 10.

In some embodiments, as shown in FIG. 11B, the first identification sub-module 822 includes a locating sub-sub-module 822a and an identification sub-sub-module 822b. The locating sub-sub-module 822a is configured to locate an area of interest in the document image using the i$^{th}$ candidate predefined edge and the first relative positional relation. More specifically, based on the i$^{th}$ candidate predefined edge and the first relative positional relation, the locating sub-sub-module 822a can determine approximate positions of the upper edge, lower edge, left edge, and right edge of the area of interest, and locate the area of interest based on the determined upper edge, lower edge, left edge, and right edge. The determination sub-sub-module 822b is configured to determine whether a character area satisfying predefined characteristics exists in the area of interest. The predefined characteristics are characteristics possessed by the character area in the target information area.

Figure 12:
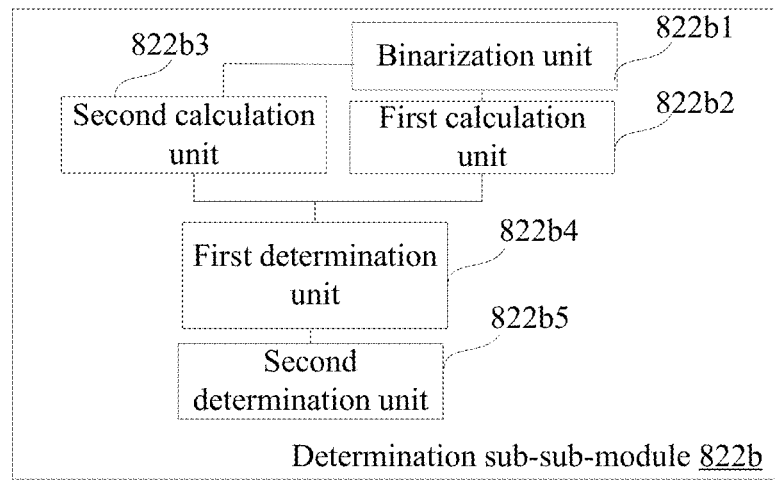
FIG. 12 is a block diagram illustrating an exemplary determination sub-sub-module in the exemplary first identification sub-module shown in FIG. 11B.

In some embodiments, as shown in FIG. 12, the determination sub-sub-module 822b includes a binarization unit 822b1, a first calculation unit 822b2, a second calculation unit 822b3, a first determination unit 822b4, and a second determination unit 822b5.

The binarization unit 822b1 is configured to binarize the area of interest to obtain a binarized area of interest. In some embodiments, the binarization unit 822b1 can first pre-process the area of interest by, for example, de-noising, filtering, edge extraction, and so on, and then binarize the pre-processed area of interest.

The first calculation unit 822b2 is configured to calculate a horizontal histogram of the binarized area of interest in a horizontal direction of the binarized area of interest. The vertical direction in the horizontal histogram represents vertical coordinates of the pixels in the binarized area of interest, and the horizontal direction in the horizontal histogram represents the number of foreground color pixels, i.e., white pixels, in each row of pixels having the same vertical coordinate.

The second calculation unit 822b3 is configured to calculate a vertical histogram of the binarized area of interest in a vertical direction of the binarized area of interest. The horizontal direction in the vertical histogram represents horizontal coordinates of the pixels in the binarized area of interest, and the vertical direction in the vertical histogram represents the number of foreground color pixels, i.e., white pixels, in each column of pixels having the same horizontal coordinate.

The first determination unit 822b4 is configured to determine a height of a consecutive row set in the horizontal histogram and a number of consecutive column sets in the vertical histogram. The consecutive row set refers to a set of consecutive rows of pixels, each of which has a number of foreground color pixels larger than a first threshold. A consecutive column set refers to a set of consecutive columns of pixels, each of which has a number of foreground color pixels larger than a second threshold.

The second determination unit 822b5 is configured to determine whether the height of the consecutive row set satisfies a predefined height range, and whether the number of consecutive columns sets satisfies a predefined number. If both conditions are satisfied, the second determination unit 822b5 determines that the target information area is successfully identified. If either condition is not satisfied, the second determination unit 822b5 determines that the target information area is not identified.

An exemplary embodiment of the present disclosure provides an apparatus for area identification that can implement a method for area identification consistent with the present disclosure, such as one of the above-described exemplary methods. The apparatus includes a processor and a memory storing processor-executable instructions, wherein the processor is configured to perform a method consistent with the present disclosure, such as one of the above-described exemplary methods.

Figure 13:
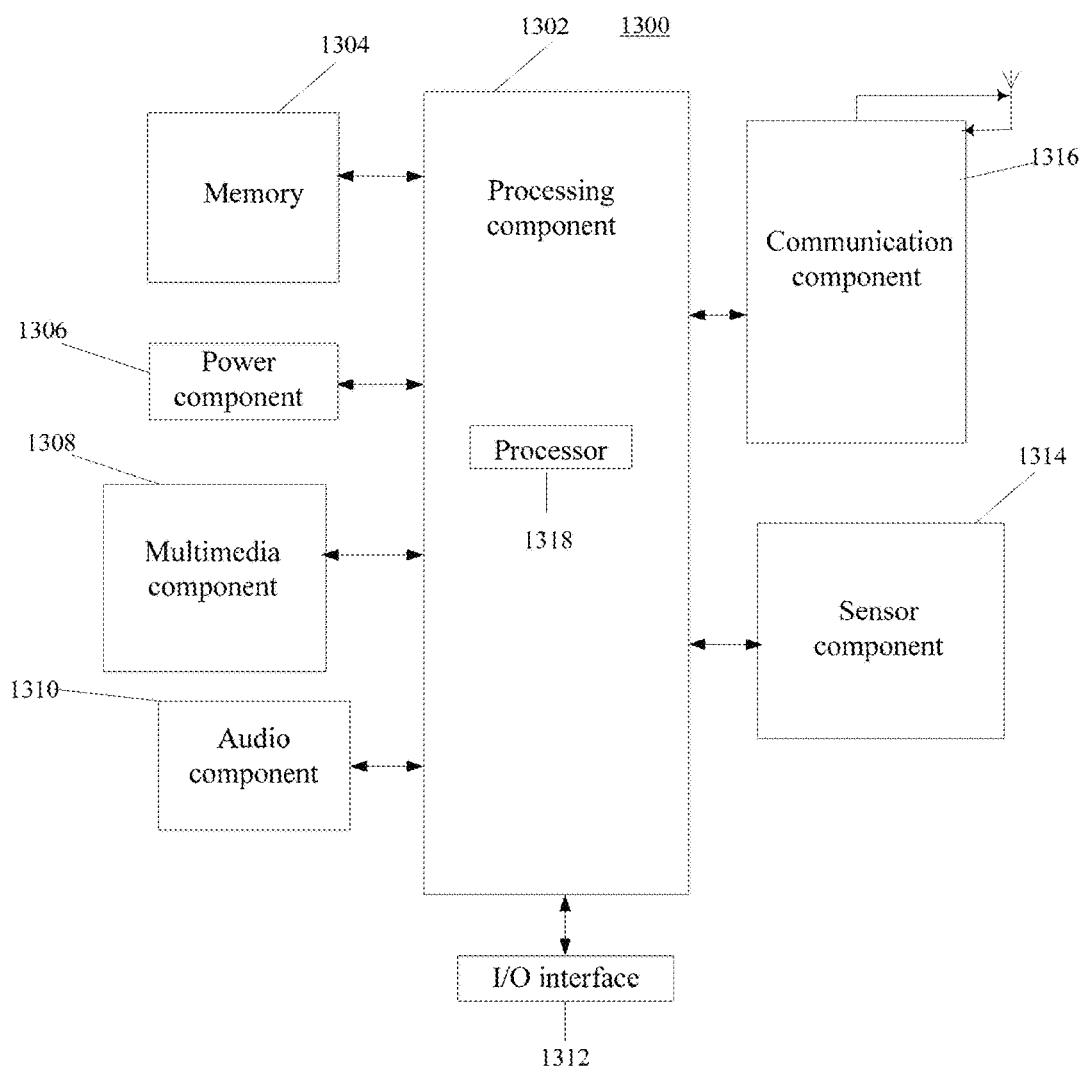
FIG. 13 is a block diagram illustrating a device for area identification according to another exemplary embodiment.

FIG. 13 is a block diagram of an apparatus 1300 for area identification according to another exemplary embodiment. For example, the apparatus 1300 may be a mobile phone, a computer, a digital broadcast terminal, a messaging device, a gaming console, a tablet, a medical device, exercise equipment, a personal digital assistant, or the like.

Referring to FIG. 13, the apparatus 1300 includes one or more of the following components: a processing component 1302, a memory 1304, a power component 1306, a multimedia component 1308, an audio component 1310, an input/output (I/O) interface 1312, a sensor component 1314, and a communication component 1316.

The processing component 1302 typically controls overall operations of the apparatus 1300, such as the operations associated with display, telephone calls, data communications, camera operations, and recording operations. The processing component 1302 may include one or more processors 1318 to execute instructions to perform all or part of a method consistent with the present disclosure, such as one of the above-described exemplary methods. Moreover, the processing component 1302 may include one or more modules which facilitate the interaction between the processing component 1302 and other components. For example, the processing component 1302 may include a multimedia module to facilitate the interaction between the multimedia component 1308 and the processing component 1302.

The memory 1304 is configured to store various types of data to support the operation of the apparatus 1300. Examples of such data include instructions for any applications or methods operated on the apparatus 1300, contact data, phonebook data, messages, pictures, video, etc. The memory 1304 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1306 provides power to various components of the apparatus 1300. The power component 1306 may include a power management system, one or more power sources, and any other components associated with the generation, management, and distribution of power for the apparatus 1300.

The multimedia component 1308 includes a screen providing an output interface between the apparatus 1300 and the user. In some embodiments, the screen may include a liquid crystal display (LCD) and a touch panel. If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1308 includes a front camera and/or a rear camera. The front camera and the rear camera may receive an external multimedia datum while the apparatus 1300 is in an operation mode, such as a photographing mode or a video mode. Each of the front camera and the rear camera may be a fixed optical lens system or have optical focusing and zooming capability.

The audio component 1310 is configured to output and/or input audio signals. For example, the audio component 1310 includes a microphone configured to receive an external audio signal when the apparatus 1300 is in an operation mode, such as a call mode, a recording mode, and a voice recognition mode. The received audio signal may be further stored in the memory 1304 or transmitted via the communication component 1316. In some embodiments, the audio component 1310 further includes a speaker to output audio signals.

The I/O interface 1312 provides an interface between the processing component 1302 and peripheral interface modules, the peripheral interface modules being, for example, a keyboard, a click wheel, buttons, and the like. The buttons may include, but are not limited to, a home button, a volume button, a starting button, and a locking button.

The sensor component 1314 includes one or more sensors to provide status assessments of various aspects of the apparatus 1300. For example, the sensor component 1314 may detect an open/closed status of the apparatus 1300, relative positioning of components (e.g., the display and the keypad, of the apparatus 1300), a change in position of the apparatus 1300 or a component of the apparatus 1300, a presence or absence of user contact with the apparatus 1300, an orientation or an acceleration/deceleration of the apparatus 1300, and a change in temperature of the apparatus 1300. The sensor component 1314 may include a proximity sensor configured to detect the presence of a nearby object without any physical contact. The sensor component 1314 may also include a light sensor, such as a CMOS or CCD image sensor, for use in imaging applications. In some embodiments, the sensor component 1314 may also include an accelerometer sensor, a gyroscope sensor, a magnetic sensor, a pressure sensor, or a temperature sensor.

The communication component 1316 is configured to facilitate communication, wired or wirelessly, between the apparatus 1300 and other devices. The apparatus 1300 can access a wireless network based on a communication standard, such as WiFi, 2G, 3G, or 4G, or a combination thereof. In an exemplary embodiment, the communication component 1316 receives a broadcast signal or broadcast associated information from an external broadcast management system via a broadcast channel. In an exemplary embodiment, the communication component 1316 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth technology, or another technology.

In exemplary embodiments, the apparatus 1300 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing a method consistent with the present disclosure, such as one of the above-described exemplary methods.

In exemplary embodiments, there is also provided a non-transitory computer-readable storage medium including instructions, such as included in the memory 1304, executable by the processor 1318 in the apparatus 1300, for performing a method consistent with the present disclosure, such as one of the above-described exemplary methods. For example, the non-transitory computer-readable storage medium may be a ROM, a RAM, a CD-ROM, a magnetic tape, a floppy disc, an optical data storage device, or the like.

According to the present disclosure, an information area on a document, such as an ID card, can be accurately located. Moreover, candidate predefined edges can be sorted according to the possibility of being a target predefined edge. As such, the target predefined edge can be identified quickly and accurately.

Other embodiments of the invention will be apparent to those skilled in the art from consideration of the specification and practice of the disclosures herein. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the invention being indicated by the following claims.

It will be appreciated that the inventive concept is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for area identification, comprising:
   identifying a plurality of candidate predefined edges in a document image of a document, the candidate predefined edges being edges in a predefined direction of the document;
   determining one of the candidate predefined edges to be a target predefined edge; and
   identifying at least one information area in the document image based on the target predefined edge,
   wherein determining one of the candidate predefined edges to be the target predefined edge includes:
   sorting the candidate predefined edges to obtain sorted candidate predefined edges;
   setting one of the sorted candidate predefined edges as a trial predefined edge;
   performing an attempted identification of a target information area in the document image using the trial predefined edge and a relative positional relation between the target predefined edge and the target information area;
   if the attempted identification using the trial predefined edge is successful:
   determining the trial predefined edge to be the target predefined edge; and
   if the attempted identification using the trial predefined edge is not successful:
   setting a next one of the sorted candidate predefined edge as a new trial predefined edge; and
   repeating the attempted identification of the target information area using the new trial predefined edge and the relative positional relation.

2. The method of claim 1, wherein sorting the candidate predefined edges includes:
   intersecting each of the candidate predefined edges with foreground color pixels at a same position of the candidate predefined edge in a processed document image, to obtain a number of intersection points corresponding to the candidate predefined edge, the processed document image being obtained by subjecting the document image to Sobel horizontal filtering and binarization; and
   sorting the candidate predefined edges based on the numbers of intersection points in a descending order.

3. The method of claim 1, wherein performing the attempted identification includes:
   locating an area of interest in the document image using the trial predefined edge and the relative positional relation; and
   determining whether a character area satisfying predefined characteristics exists in the area of interest, the predefined characteristics being characteristics possessed by the character area in the target information area.

4. The method of claim 3, wherein determining whether the character area satisfying the predefined characteristics exists in the area of interest includes:
   binarizing the area of interest to obtain a binarized area of interest;
   calculating a horizontal histogram for the binarized area of interest in a horizontal direction of the binarized area of interest, a vertical direction in the horizontal histogram representing vertical coordinates of pixels in the binarized area of interest, and a horizontal direction in the horizontal histogram representing a number of foreground color pixels in each row of pixels having a same vertical coordinate;
   calculating a vertical histogram for the binarized area of interest in a vertical direction of the binarized area of interest, a horizontal direction in the vertical histogram representing horizontal coordinates of the pixels in the binarized area of interest, and a vertical direction in the vertical histogram representing a number of foreground color pixels in each column of pixels having the same horizontal coordinate;
   determining a height of a consecutive row set in the horizontal histogram and a number of consecutive column sets in the vertical histogram, the consecutive row set being a set of consecutive rows of pixels each having a number of foreground color pixels larger than a first threshold, and a consecutive column set being a set of consecutive columns of pixels each having a number of foreground color pixels larger than a second threshold; and
   determining whether the height of the consecutive row set satisfies a predefined height range and whether the number of consecutive column sets satisfies a predefined number to determine whether the character area satisfying the predefined characteristics exists in the area of interest.

5. The method of claim 1, wherein identifying the plurality of candidate predefined edges in the document image includes:
   subjecting the document image to Sobel horizontal filtering and binarization to obtain a processed document image;
   conducting a straight line detection in a predefined area in the processed document image to obtain a plurality of straight lines; and
   identifying the straight lines as the candidate predefined edges.

6. The method of claim 1, wherein identifying the at least one information area in the document image based on the target predefined edge includes:

determining an information area based on the target predefined edge and a relative positional relation between the target predefined edge and the information area.

7. A device for area identification, comprising:
a processor; and
a memory storing instructions that, when executed by the processor, cause the processor to:
identify a plurality of candidate predefined edges in a document image of a document, the candidate predefined edges being edges in a predefined direction of the document;
determine one of the candidate predefined edges to be a target predefined edge; and
identify at least one information area in the document image based on the target predefined edge,
wherein the instructions, when executed by the processor, further cause the processor to:
sort the candidate predefined edges to obtain sorted candidate predefined edges;
set one of the sorted candidate predefined edges as a trial predefined edge;
perform an attempted identification of a target information area in the document image using the trial predefined edge and a relative positional relation between the target predefined edge and the target information area;
if the attempted identification using the trial predefined edge is successful:
determine the trial predefined edge to be the target predefined edge; and
if the attempted identification using the trial predefined edge is not successful:
set a next one of the sorted candidate predefined edge as a new trial predefined edge; and
repeat the attempted identification of the target information area using the new trial predefined edge and the relative positional relation.

8. The device of claim 7, wherein the instructions, when executed by the processor, further cause the processor to:
intersect each of the candidate predefined edges with foreground color pixels at a same position of the candidate predefined edge in a processed document image, to obtain a number of intersection points corresponding to the candidate predefined edge, the processed document image being obtained by subjecting the document image to Sobel horizontal filtering and binarization; and
sort the candidate predefined edges based on the numbers of intersection points in a descending order.

9. The device of claim 7, wherein the instructions, when executed by the processor, further cause the processor to:
locate an area of interest in the document image using the trial predefined edge and the relative positional relation; and
determine whether a character area satisfying predefined characteristics exists in the area of interest, the predefined characteristics being characteristics possessed by the character area in the target information area.

10. The device of claim 9, wherein the instructions, when executed by the processor, further cause the processor to:
binarize the area of interest to obtain a binarized area of interest;
calculate a horizontal histogram for the binarized area of interest in a horizontal direction of the binarized area of interest, a vertical direction in the horizontal histogram representing vertical coordinates of pixels in the binarized area of interest, and a horizontal direction in the horizontal histogram representing a number of foreground color pixels in each row of pixels having a same vertical coordinate;
calculate a vertical histogram for the binarized area of interest in a vertical direction of the binarized area of interest, a horizontal direction in the vertical histogram representing horizontal coordinates of the pixels in the binarized area of interest, and a vertical direction in the vertical histogram representing a number of foreground color pixels in each column of pixels having the same horizontal coordinate;
determine a height of a consecutive row set in the horizontal histogram and a number of consecutive column sets in the vertical histogram, the consecutive row set being a set of consecutive rows of pixels each having a number of foreground color pixels larger than a first threshold, and a consecutive column set being a set of consecutive columns of pixels each having a number of foreground color pixels larger than a second threshold; and
determine whether the height of the consecutive row set satisfies a predefined height range and whether the number of consecutive column sets satisfies a predefined number to determine whether the character area satisfying the predefined characteristics exists in the area of interest.

11. The device of claim 7, wherein the instructions, when executed by the processor, further cause the processor to:
subject the document image to Sobel horizontal filtering and binarization to obtain a processed document image;
conduct a straight line detection in a predefined area in the processed document image to obtain a plurality of straight lines; and
identify the straight lines as the candidate predefined edges.

12. The device of claim 7, wherein the instructions, when executed by the processor, further cause the processor to:
determine an information area based on the target predefined edge and a relative positional relation between the target predefined edge and the information area.

13. A non-transitory computer readable storage medium having stored therein instructions that, when executed by a processor of a device, cause the processor to:
identify a plurality of candidate predefined edges in a document image of a document, the candidate predefined edges being edges in a predefined direction of the document;
determine one of the candidate predefined edges to be a target predefined edge; and
identify at least one information area in the document image based on the target predefined edge,
wherein the instructions, when executed by the processor, further cause the processor to:
sort the candidate predefined edges to obtain sorted candidate predefined edges;
set one of the sorted candidate predefined edges as a trial predefined edge;
perform an attempted identification of a target information area in the document image using the trial predefined edge and a relative positional relation between the target predefined edge and the target information area;
if the attempted identification using the trial predefined edge is successful:
determine the trial predefined edge to be the target predefined edge; and if the attempted identification using the trial predefined edge is not successful:
set a next one of the sorted candidate predefined edge as a new trial predefined edge; and
repeat the attempted identification of the target information area using the new trial predefined edge and the relative positional relation.

\* \* \* \* \*